Sept. 21, 1965 L. E. SHUMAKER 3,207,233
IMPLEMENT CARRIAGE FOR TRACTORS
Filed June 12, 1964 2 Sheets-Sheet 1
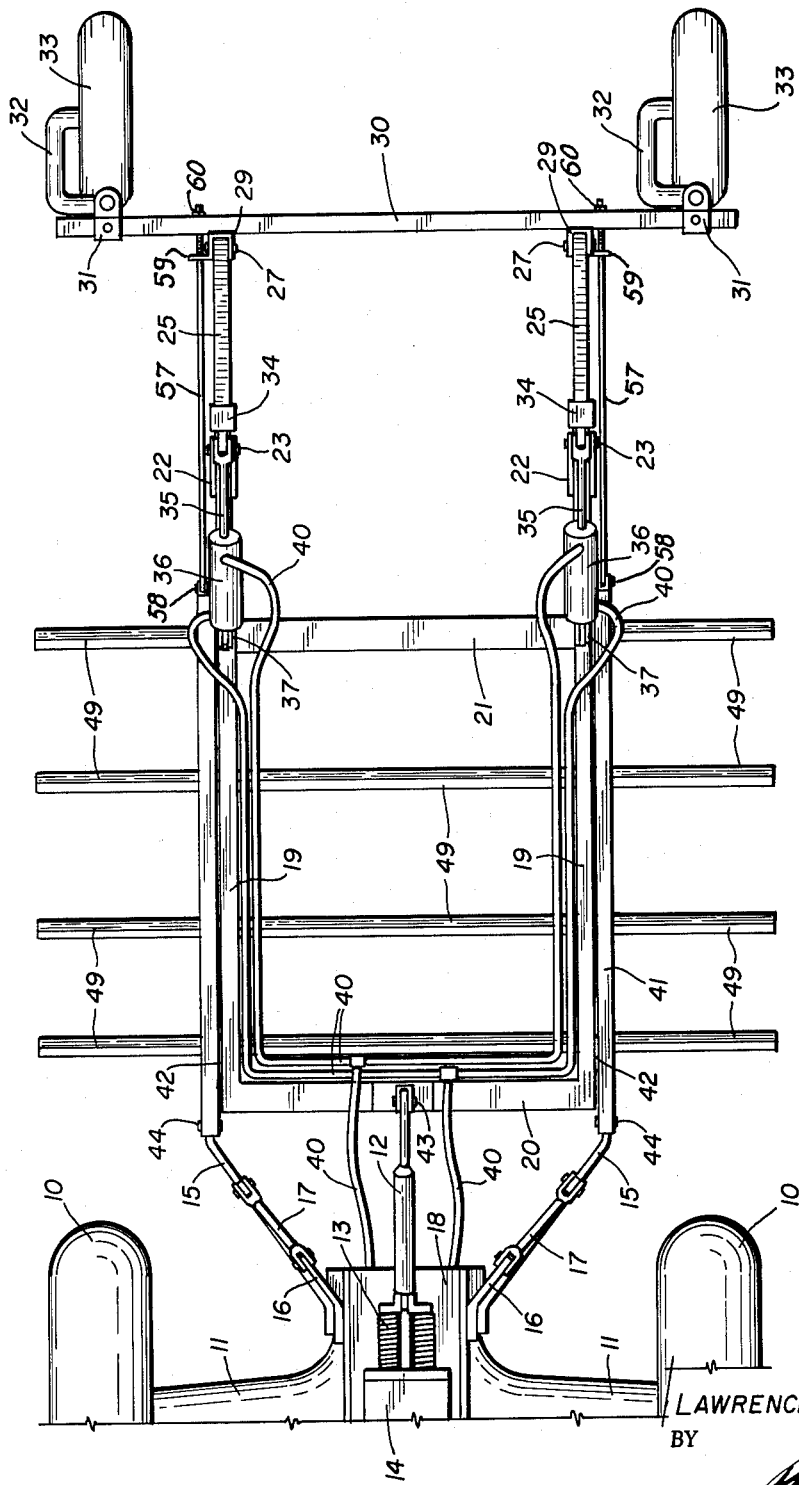
*Fig. 1*
INVENTOR.
LAWRENCE E. SHUMAKER
BY
ATTORNEY Sept. 21, 1965   L. E. SHUMAKER   3,207,233
IMPLEMENT CARRIAGE FOR TRACTORS
Filed June 12, 1964   2 Sheets-Sheet 2
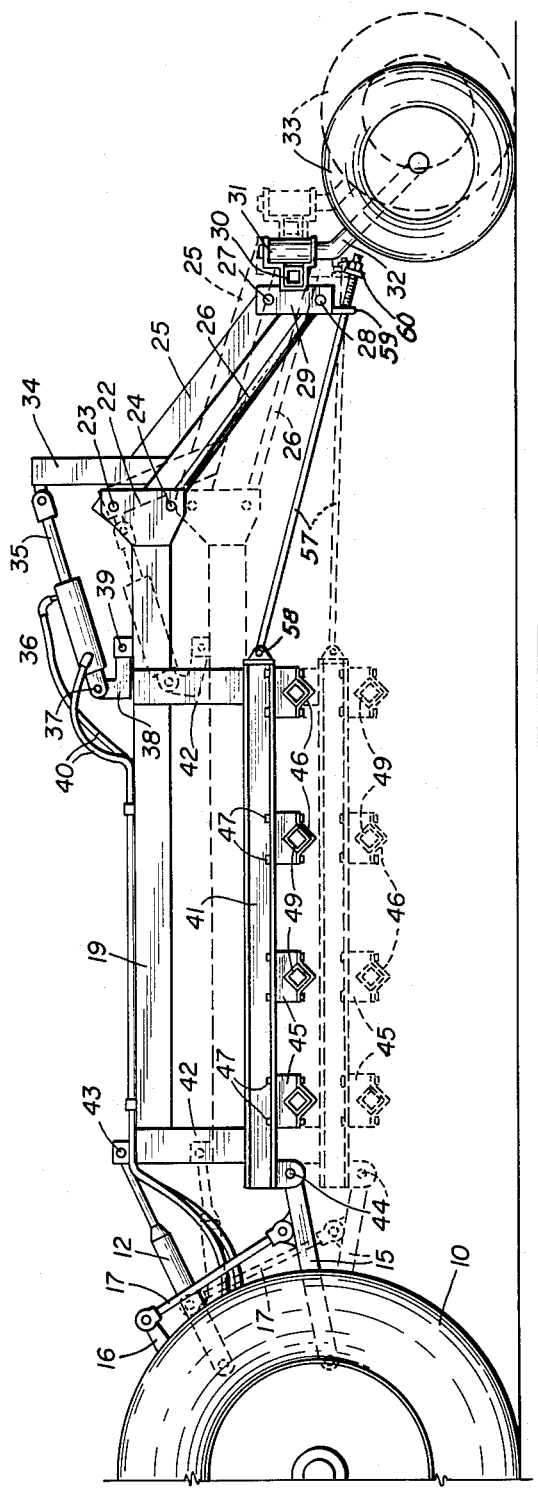
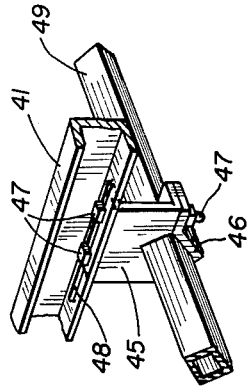
INVENTOR.
LAWRENCE E. SHUMAKER
BY
ATTORNEY

United States Patent Office 3,207,233
Patented Sept. 21, 1965

3,207,233
IMPLEMENT CARRIAGE FOR TRACTORS
Lawrence E. Shumaker, Denver, Colo., assignor to The Eversman Mfg. Company, Denver, Colo., a corporation of Colorado
Filed June 12, 1964, Ser. No. 374,667
4 Claims. (Cl. 172—316)

This invention relates to a semi-trailer carriage for farm tractors, of the three-point-hitch type, for supporting implements such as plows, cultivators, planters, diggers, rudders and other field tools and implements in working position on the tractor.

The principal object of the invention is to provide a farm implement carriage, of the above type, which can be used to support any desired number of implements in any desired arrangement over a plurality of crop rows and which can be fully controlled by the tractor driver to simultaneously adjust the working depth of all the supported implements.

Another object is to provide an implement carriage for tractors, the major portion of the weight of which will be supported on trailing wheels so constructed that all of the implements may be lifted from the ground, without placing additional weight on the tractor, for turning the tractor at the ends of the rows and for field-to-field transportation.

A further object is to provide an implement carriage for attachment to the conventional 3-point hitch of the tractor which will automatically maintain a uniform horizontal position as it moves vertically to and from the working position.

A still further object is to provide a multi-row semi-trailer type implement carriage which will accurately maintain the implements in their rows as the tractor moves forwardly and which can be quickly and easily coupled to and uncoupled from the tractor.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a plan view of the improved implement carriage showing it attached to a conventional three-point hitch tractor;

FIG. 2 is a left side elevational view of the carriage showing the raised position in solid line and the lowered working position thereof in broken line; and FIGS. 3 and 4 are fragmentary detail perspective views showing tool bar mountings to be later described.

Conventional tractor elements are designated by numeral as follows: tractor wheels 10, rear axle housing 11, top link 12, master control valve springs 13, master control valve 14, botttom links, 15, lift levers 16, lift rods 17 and differential housing 18. In the conventional three-point-hitch, the drag of the implements exerts tension on the bottom links 15. The top link 12 pushes forward against the tractor. When push exceeds bias of springs 13 the master control valve 14 is actuated to lift levers 16 and raise bottom links 15.

The above is conventional three-point tractor hitch equipment of which advantage is taken by the present implement carriage.

The implement carriage of this invention employs a rigid, horizontal, rectangular frame consisting of elongated side frame members 19 joined by a front frame member 20 and a transversally extending rear frame member 21. The side frame members 19 extend rearwardly of the rear frame member 21 and each terminates in a pair of spaced-apart hinge plates 22. Each pair of hinge plates 22 supports an upper hinge bolt 23 and a lower hinge bolt 24 extending between the plates of the pair in vertical alignment with each other.

An upper reach arm 25 is pivotally mounted at its forward extremity on each upper hinge bolt 23 and a lower reach rod 26 is similarly mounted on each lower hinge bolt 24. The reach arms 25 and the reach rods 26 extend rearwardly and downwardly in parallel relation from the rear extremities of the side frame members 19 to upper and lower pivot bolts 27 and 28, respectively, mounted in vertical alignment in pairs of vertical, pivot mounting angles 29.

The mounting angles 29 are welded or otherwise secured to the forward face of a horizontal, transversally-extending, tubular caster beam 30, upon which two caster bearing members 31 are mounted for longitudinal adjustment therealong. A caster wheel arm 32 is rotatably mounted at its upper extremity on a vertical axis in each of the caster bearing members 31. The caster wheel arms extend downwardly and rearwardly to the journals of pneumatically tired caster wheels 33 to support the rear extremity of the carriage.

Each of the reach arms is provided with a rigidly-mounted, upwardly extending, actuating lever 34, to the upper extremity of which, a hydraulic plunger 35 is pivotally connected. The plungers 35 extend from hydraulic cylinders 36, there being one of the cylinders 36 mounted over each of the side frame members 19. The hydraulic cylinders are pivotally mounted at their forward extremities, as shown at 37, on tilting links 38 which rest upon the side frame members 19 and are in turn pivoted to the latter, rearwardly of the hydraulic pivots 37, as shown at 39. Hydraulic fluid is supplied to and withdrawn from both cylinders 36 simultaneously through the medium of hydraulic conduits 40 leading to the hydraulic system of the tractor.

An elongated, channel-shaped tool mounting beam 41 is rigidly suspended below each of the side frame members 19 upon plate hangers 42 welded or otherwise secured to the members 19 and 41. The top link 12 of the tractor is hingedly connected to a pivotal mounting 43 at the middle of the front frame member 20 and the two bottom links 15 of the tractor are connected as indicated at 44 to the forward extremities of the mounting beams 41 to support the forward extremity of the carriage.

A plurality of clamp brackets 45 provided with clamp straps 46 are mounted below each mounting beam by means of clamp bolts 47 which extend through the straps 46, the brackets 45 and through elongated bolt slots 48 in the lower flange of the mounting beams 41, as shown in FIG. 3.

The brackets 45 and the straps 46 are provided with 90° V-shaped sockets to receive and clamp a plurality of parallel, transversely-extending tubular, square tool beams 49 in place below the mounting members 41. The tool beams 49 project oppositely outward at both sides of the carriage and are designed to support any desired agricultural tools or implements in working position.

The various tools and implements may be mounted on the tool beams 49 in any conventional manner. A preferred means of mounting is illustrated in FIG. 4 comprising a triangular clamp body 50 having a V-shaped notch 51 in its forward face to receive a tool beam 49 and a vertical rectangular shank passage 52 to receive a tool shank such as a cultivator or plow shank as indicated in broken line at 53. The shank 53 is locked in any desired vertical position in the shank passage 52 by means of a suitable set screw 54. Two stud bolts 56 extend from the forward face for clamping a notched clamp strap 55 against the tool beam 49.

The clamp brackets 45 can be adjusted forward and back in the bolt slots 48, the tool beams 49 can be adjusted to the right and left in the clamp brackets 45, and the clamp bodies 50 can be adjusted longitudinally of the tool beams 49 so that any desired arrangement can be made to accommodate and position and desired number and kind of tools and implements on the carriage.

Let us assume that the carriage is in the lower or working position, as indicated in broken line in FIG. 2, and that it is desired to elevate the tools and implements. The driver admits hydraulic fluid to the cylinders 36 to urge the levers 34 rearwardly to pry the forward extremities of the reach arms 25 and reach rods 26 upwardly with the caster wheels 33 acting as a fulcrum. This elevates the rear of the carriage imparting a forward tilting bias thereto. The forward bias forces the pivotal mounting 43 forwardly causing the top link 12 to compress the control valve springs 13 to automatically actuate the tractor three-way valve 14. Actuation of the valve 14 hydraulically causes the lift levers 16 to raise the bottom links 15 and the front of the carriage as the rear is raised by the hydraulic cylinders 36. Thus, the carriage rises in a horizontal plane to the elevated, solid line position of FIG. 2.

To lower the carraige, it is only necessary to hydraulically retract the plungers 35 to allow the actuating levers 34 to swing forwardly to lower the rear extremity of the carriage. This causes the pivoted mounting 43 to move rearwardly. The latter rearward movement actuates the tractor valve 14 to swing the lift levers downwardly to simultaneously lower the forward extremity of the carriage.

The maximum descent or working position can be pre-set by means of stop rods 57, there being one stop rod hinged at 58 to the rear extremity of each of the mounting beams 41. The stop rods extend rearwardly and downwardly through guide clips 59, mounted on the caster beam 30 to receive adjustable stop nuts 60. It can be seen that, as the carriage descends, the caster beam will move rearwardly causing the stop clips 59 to travel rearwardly on the stop rods 57 until they contact the stop nuts 60 thus preventing further forward movement of the actuating levers 34 and further descent of the carriage.

The entire weight of the rear extremity of the carriage is now fixedly supported by the stop rods 57. Since the hydraulic plungers 35 are now held stationary, the hydraulic cylinders may move rearwardly on their plungers under the influence of the hydraulic fluid tilting the links 38 upwardly without affecting the setting of the carriage. Thus, the carriage can be quickly and accurately lowered to the pre-set working position at the start of the rows.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. An implement supporting carriage, for attachment to a tractor of the type provided with a three-point hitch having lower drag links, an upper valve-actuating top link and a hydraulic mechanism controlled by said valve for lifting said lower drag links, comprising:
    (a) an implement-carrying frame;
    (b) upper means at the front of said frame for connecting said frame to said top link;
    (c) lower means at the front of said frame below said upper means for connecting said frame to said lower drag links to support the front of said frame;
    (d) a pair of reach members pivoted to and extending rearwardly and downwardly from each side of said frame;
    (e) a horizontal caster beam extending between the rear extremities of said two pairs of reach members;
    (f) two vertical, spaced-apart caster bearings mounted on said caster beam;
    (g) a caster wheel arm, carrying a caster wheel, rotatably mounted in each of said vertical caster bearings to support said caster beam; and
    (h) remote-controlled power means mounted on said frame to simultaneously swing said pairs of reach members downwardly and upwardly to raise and lower the rear extremity of said frame.

2. An implement supporting carriage as described in claim 1 having:
    (a) longitudinally extending, spaced-apart mounting members secured to and carried by said frame; and
    (b) means for mounting implements upon said mounting members.

3. An implement carriage as described in claim 2 in which the stop means comprise:
    (a) a tension member pivotally secured at its forward extremity to said frame and extending rearwardly into slidable relation with a guide member affixed to said caster beam; and
    (b) adjustable stop means on said tension member positioned to engage said guide member for limiting the rearward movement of said caster beam therealong.

4. An implement carriage as described in claim 3 in which the means for mounting implements comprises:
    (a) clamp brackets secured below and adjustable along said mounting members;
    (b) a tool beam mounted in said clamp brackets and extending transversally of said frame from a clamp bracket on one mounting member to a clamp bracket on the other mounting member;
    (c) a clamping member mounted on and adjustable along said tool beam;
    (d) means for securing said clamping member to said tool beam at any desired point along the latter; and
    (e) means for securing an implement to said clamping member.

References Cited by the Examiner
UNITED STATES PATENTS
2,968,356  1/61  Mydels _____ 172—491 X
FOREIGN PATENTS
230,262  9/60  Australia.

ABRAHAM G. STONE, *Primary Examiner.*
T. GRAHAM CRAVER, *Examiner.*